United States Patent
Suzuki et al.

(10) Patent No.: US 9,033,014 B2
(45) Date of Patent: May 19, 2015

(54) RUBBER COMPOSITION AND TIRE USING THE SAME

(75) Inventors: Eiju Suzuki, Kodaira (JP); Yoichi Ozawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1416 days.

(21) Appl. No.: 10/562,947

(22) PCT Filed: Jun. 25, 2004

(86) PCT No.: PCT/JP2004/008989
§ 371 (c)(1),
(2), (4) Date: Mar. 13, 2008

(87) PCT Pub. No.: WO2005/003226
PCT Pub. Date: Jan. 13, 2005

(65) Prior Publication Data
US 2008/0190532 A1 Aug. 14, 2008

(30) Foreign Application Priority Data

Jul. 1, 2003 (JP) ................................ 2003-189334

(51) Int. Cl.
*B60C 1/00* (2006.01)
*B60C 9/02* (2006.01)
*B60C 11/00* (2006.01)
*B60C 9/18* (2006.01)
*C08L 7/00* (2006.01)
*C08L 9/00* (2006.01)

(52) U.S. Cl.
CPC ............... *C08L 7/00* (2013.01); *B60C 11/0008* (2013.01); *B60C 9/02* (2013.01); *B60C 9/18* (2013.01); *B60C 1/00* (2013.01); *C08L 9/00* (2013.01)

(58) Field of Classification Search
None
See application file for complete search history.

(56) References Cited

U.S. PATENT DOCUMENTS

| 3,913,652 | A | * | 10/1975 | Imamura et al. ............... 152/527 |
| 4,192,366 | A | * | 3/1980 | Scriver et al. ............... 152/209.1 |
| 4,321,168 | A | | 3/1982 | Ueda et al. |
| 5,191,003 | A | * | 3/1993 | Inui et al. ....................... 524/206 |
| 5,396,940 | A | * | 3/1995 | Segatta et al. ............... 152/209.1 |
| 5,965,661 | A | | 10/1999 | Du Bois et al. |
| 6,211,281 | B1 | | 4/2001 | Kusano |

FOREIGN PATENT DOCUMENTS

| EP | 893281 | * | 1/1999 |
| JP | 59-196338 | * | 11/1984 |
| JP | 63-297437 | A | 12/1988 |
| JP | 2004-513998 | A | 5/2004 |
| WO | WO 02/38635 | A1 | 5/2002 |

* cited by examiner

*Primary Examiner* — Justin Fischer
(74) *Attorney, Agent, or Firm* — Sughrue Mion, PLLC

(57) ABSTRACT

This invention relates to a rubber composition including a polyisoprene rubber having a very high cis-1,4-bond content and having an excellent balance between dynamic properties and processability, and more particularly to a rubber composition comprising as a rubber component (A) a synthetic polyisoprene rubber having a cis-1,4-bond content of not less than 99.0%, a 3,4-bond content of not more than 0.5% and a Mooney viscosity $ML_{1+4}$ (100° C.) of 20-110 and (B) a natural rubber.

8 Claims, No Drawings

RUBBER COMPOSITION AND TIRE USING THE SAME

TECHNICAL FIELD

This invention relates to a rubber composition and a tire using the same, and more particularly to a rubber composition having excellent durability and processability.

BACKGROUND ART

Heretofore, a synthetic polyisoprene rubber (IR) was developed as a synthetic rubber having a structure similar to a natural rubber and widely used in rubber articles such as a tire and the like. The dynamic properties of the polyisoprene rubber are mainly dependent on a cis-1,4-bond content and a molecular weight, and the processability thereof is dependent on a branch ratio, gel quantity and so on in addition to the molecular weight.

Although the synthetic polyisoprene rubber has the structure similar to the natural rubber as mentioned above, the cis-1,4-bond content of the synthetic polyisoprene rubber is about 98% at most, while the cis-1,4-bond content of the natural rubber is not less than 99%, and it is thought that the dynamic properties of the polyisoprene rubber are inferior to those of the natural rubber due to the slight difference in the structure. Therefore, it is further demanded to develop polyisoprene rubbers having a higher cis-1,4-bond content and excellent dynamic properties. Also, polyisoprene rubbers being less in the branch ratio and gel quantity and excellent in the processability are demanded from a viewpoint of industrial practicality.

Although it is known that a rubber composition having an excellent balance between the processability and the dynamic properties is obtained by blending the polyisoprene rubber with natural rubber, the rubber composition has a problem that the dynamic properties of the rubber composition are deteriorated as the ratio of the polyisoprene rubber in the rubber composition is increased. As a cause on such a deterioration are considered a difference in the micro-structure such as a 3,4-bond content or the like in addition to the cis-1,4-bond content, a difference of other structural factor derived from the natural rubber and so on, but it is unclear which is main reason.

On the other hand, there is developed a technique of producing a polyisoprene rubber having a cis-1,4-bond content of not less than 98.5% (see WO02/38635A). Furthermore, a polyisoprene rubber having a very high cis-1,4-bond content, which has about 100% of cis-1,4-bond content is recently developed and announced (see Shojiro Kaita, Yoshiharu Doi, Kumiko Kaneko, Akira Horiuchi and Yasuo Wakatsuki, lecture abstract of 83rd spring annual meeting of Chemical Society of Japan; Institute of Physical and Chemical Research, "A synthetic rubber for a future high-performance tire has been accomplished", [online], Mar. 18, 2003, Internet <URL: http://www.riken.go.jp/w-world/info/release/press/2003/030318/index.html>). However, the balance between the dynamic properties and the processability in the rubber composition comprising a blend of natural rubber and the polyisoprene rubber was not utterly mentioned in the official gazette and announcement, so that its industrial value is unclear.

SUMMARY OF THE INVENTION

It is, therefore, an object of the invention to provide a rubber composition containing a polyisoprene rubber being very high in cis-1,4-bond content and having an excellent balance between dynamic properties and processability.

The inventors have made various studies in order to achieve the above object and discovered that a rubber composition comprising a polyisoprene rubber in which the cis-1,4-bond content is very high and a Mooney viscosity is within a certain range is excellent in the balance between the processability and the dynamic properties such as wear resistance, durability and the like, and as a result the invention has been accomplished.

That is, the rubber composition of the invention comprises as a rubber component (A) a synthetic polyisoprene rubber having a cis-1,4-bond content of not less than 99.0%, a 3,4-bond content of not more than 0.5% and a Mooney viscosity $ML_{1+4}$ (100° C.) of 20-110, and (B) a natural rubber.

In a preferable embodiment of the rubber composition of the invention, a ratio by mass of (A) the synthetic polyisoprene rubber to a total mass of (A) the synthetic polyisoprene rubber and (B) the natural rubber [i.e. a mass of (A)/{a mass of (A)+a mass of (B)}×100] is 5-60 mass %.

In another preferable embodiment of the rubber composition of the invention, a total content of (A) the synthetic polyisoprene rubber and (B) the natural rubber in the rubber component is not less than 40 mass %. It is further preferable that the total content of (A) the synthetic polyisoprene rubber and (B) the natural rubber in the rubber component is not less than 80 mass %.

A filler to be compounded in the rubber composition of the invention is not particularly limited, but fillers usually used in the rubber industry such as carbon black, silica, alumina, aluminum hydroxide, clay, calcium carbonate and the like can be used. As the carbon black can be used various grades of carbon black such as SAF, HAF, ISAF, FEF, GPF and so on. It is preferable to use a carbon black having a nitrogen adsorption specific surface area ($N_2SA$) of not less than 70 $m^2/g$. The silica is not particularly limited, but wet silica, dry silica and colloidal silica are preferable. It is preferable to use a silica having a nitrogen adsorption specific surface area ($N_2SA$) of not less than 180 $m^2/g$. These fillers may be used alone or in a combination of two or more. A total amount of these filler compounded is not less than 10 parts by mass, preferably 30-120 parts by mass, more preferably 40-80 parts by mass based on 100 parts by mass of the rubber component. Furthermore, the rubber composition of the invention is preferable to be sulfur crosslinkable.

The rubber composition of the invention is suitable for a tread and/or a casing member of a tire.

Furthermore, the tire according to the invention is characterized in that the above rubber composition is applied to a tread or a casing member.

BEST MODE FOR CARRYING OUT THE INVENTION

The invention will be described in detail below. The rubber composition according to the invention is characterized by comprising as a rubber component (A) a synthetic polyisoprene rubber having a cis-1,4-bond content of not less than 99.0%, a 3,4-bond content of not more than 0.5% and a Mooney viscosity $ML_{1+4}$ (100° C.) of 20-110, and (B) a natural rubber. The polyisoprene rubber (IR) contained in the rubber composition has dynamic properties equal to that of the natural rubber because the cis-1,4-bond content is very high and the 3,4-bond content is very low. Also, the polyisoprene rubber is excellent in the processability because the Mooney viscosity is within a predetermined range.

When the cis-1,4-bond content of the polyisoprene rubber contained in the rubber composition is less than 99.0%, the extension crystallinity is low and the dynamic properties are deteriorated. When the 3,4-bond content of the polyisoprene rubber exceeds 0.5%, the extension crystallinity is harmed and the dynamic properties are deteriorated. When the Mooney viscosity $ML_{1+4}$ (100° C.) is less than 20, the dynamic properties such as wear resistance, durability and the like are deteriorated, while when it exceeds 110, the production becomes difficult and the processability lowers. Moreover, the polyisoprene rubber is not particularly limited, but the number average molecular weight thereof is preferably 50,000-1,500,000, more preferably 100,000-750,000.

The polyisoprene rubber can be produced by polymerizing isoprene in the presence of a gadolinium metallocene catalyst with reference to the above-described Kaita et al, lecture abstract of 83rd spring annual meeting of Chemical Society of Japan, a homepage of Institute of Physical and Chemical Research, "A synthetic rubber for a future high performance tire has been accomplished" and so on. For example, $(C_5Me_5)_2Gd[(\mu\text{-Me})AlMe_2(\mu\text{-Me})]_2Gd(C_5Me_5)_2$ (gadolinium metallocene catalyst) is synthesized according to the method described by Kaita, S.; Hou, Z.; Wakatsuki, Y. Macromol. Rapid Commun. in press, and the resulting gadolinium metallocene catalyst, $[Ph_3C][B(C_6F_5)_4]$ and $Al^iBu_3$ are dissolved in toluene in turn in a glass bottle under an inert gas atmosphere, and the bottle is capped, and then isoprene monomer is added to conduct the polymerization. The polymerization is preferable to be conducted below room temperature. As the polymerization temperature is lowered, the cis-1,4-bond content of the resulting polyisoprene rubber is increased. At −40° C. is obtained a polyisoprene rubber having a cis-1,4-bond content of not less than 99.9% and a 3,4-bond content of not more than 0.1%. The micro-structure of the polyisoprene rubber can be analyzed by $^1$H-NMR and $^{13}$C-NMR.

Also, the polyisoprene rubber can be produced by polymerizing isoprene at a temperature of not higher than 5° C. in the presence of a conjugated diene monomer, an organic phosphate of a rare earth metal, an alkylaluminum (alkylating agent) and an alkylaluminum halide (halogen donor), in which a molar ratio of the alkylating agent/the rare earth metal salt is within a range of 1-5, according to the above WO02/38635A.

As the rubber component in the rubber composition according to the invention are mentioned natural rubber, styrene-butadiene copolymer rubber (SBR), polybutadiene rubber (BR), acrylonitrile-butadiene rubber (NBR), ethylene-propylene-diene rubber (EPDM), butyl rubber (IIR), halogenated butyl rubber and the like in addition to the above polyisoprene rubber. These rubber components may be used alone or in a combination of two or more.

In the rubber component in the rubber composition of the invention, a ratio by mass of (A) the synthetic polyisoprene rubber to a total of (A) the synthetic polyisoprene rubber and (B) the natural rubber is preferable to be 5-60 mass %. When the ratio of (A) the synthetic polyisoprene rubber is less than 5 mass %, the effect by compounding the (A) the synthetic polyisoprene rubber is little and the balance between the dynamic properties and the processability is not improved. While, when the ratio of (A) the synthetic polyisoprene rubber exceeds 60 mass %, the wear resistance and the durability of the rubber composition are deteriorated and also the adhesion property to a roll is deteriorated.

The rubber component in the rubber composition of the invention is required to contain (B) the natural rubber, and a sum of the content of (A) the synthetic polyisoprene rubber and the content of (B) the natural rubber is preferably not less than 40 mass % of the total rubber component, more preferably not less than 80 mass %. When the sum of the contents is less than 40 mass %, the target performances may not be obtained.

The rubber composition according to the invention is preferable to be compounded with not less than 10 parts by mass, preferably 30-120 parts by mass, more preferably 40-80 parts by mass of the filler based on 100 parts by mass of the rubber component. As the filler can be used ones usually used in the rubber industry such as carbon black, silica, alumina, aluminum hydroxide, clay, calcium carbonate and the like, but the reinforcing fillers having a high reinforcing effect such as the carbon black and the silica are preferable. These fillers may be used alone or in a combination of two or more. When the amount of the reinforcing filler compounded is less than 10 parts by mass per 100 parts by mass of the rubber component, the strength of the rubber composition is insufficient and the dynamic properties such as wear resistance, durability and the like are deteriorated. Moreover, the amount of the reinforcing filler compounded is preferably 30-120 parts by mass, more preferably 40-80 parts by mass from a viewpoint of the workability in the milling of the rubber composition. Since the rubber composition of the invention contains the polyisoprene rubber having an excellent processability, a greater amount of the filler having a high reinforcing effect can be compounded. Also, the rubber composition is preferable to be sulfur crosslinkable. A vulcanized rubber obtained by crosslinking the rubber composition with sulfur has a sufficient strength as a tire member.

As the reinforcing filler is preferable a carbon black having a nitrogen adsorption specific surface area ($N_2SA$) of not less than 70 $m^2/g$. As the carbon black having the $N_2SA$ of not less than 70 $m^2/g$ are mentioned carbon blacks of HAF grade, ISAF grade and SAF grade. Although the carbon black having the $N_2SA$ of not less than 70 $m^2/g$ is excellent in the reinforcing effect of rubber but is inferior in the processability such as the workability in the milling or the like, the rubber composition according to the invention has a good processability even if the carbon black having the high reinforcing effect is compounded, because the rubber composition contains the above polyisoprene rubber having the excellent processability. When the $N_2SA$ of the carbon black is less than 70 $m^2/g$, the reinforcing effect of the rubber is low, and the dynamic properties of the rubber composition can not be improved sufficiently.

The silica used as a reinforcing filler for the rubber composition of the invention is preferable to have a nitrogen adsorption specific surface area ($N_2SA$) of not less than 180 $m^2/g$. When the silica having a nitrogen adsorption specific surface area ($N_2SA$) of less than 180 $m^2/g$ is used, the sufficient reinforcing effect may not be obtained.

In addition to the above rubber component and reinforcing filler such as carbon black and silica, the rubber composition of the invention may be properly compounded with additives usually used in the rubber industry such as a vulcanizing agent, a vulcanization accelerator, an antioxidant, a scorch retarder, a softening agent, zinc oxide, stearic acid, a silane coupling agent and the like within a scope of not damaging the object of the invention. As the additive can be preferably used commercially available ones. Moreover, the rubber composition can be produced by compounding the rubber component with the various additives properly selected if necessary and milling, warming, extruding and so on.

The rubber composition of the invention can be applied to any rubber members constituting the tire such as a tread, a casing member and the like. Among these tire members, the rubber composition is suitable for the tread and particularly it is preferably used for a cap rubber and a base rubber of the tread having a cap-base structure. Also, the rubber composition of the invention can be applied to any casing members because the processability is good, and particularly it is suitable for an elongating member such as a belt, a carcass ply, a belt reinforcing layer or the like. Furthermore, the rubber composition of the invention is suitable for an extruded member such as a cushion rubber, a bead filler rubber or the like.

The tire according to the invention is characterized by using the above rubber composition and is particularly suitable as a heavy duty tire. Since the tire according to the invention uses the above rubber composition having a good processability, the productivity is good. Also, since the rubber composition is excellent in the dynamic properties, the wear resistance and durability are excellent. The tire according to the invention is not particularly limited as far as the above rubber composition is used, and can be produced by the usual method.

The following examples are given in illustration of the invention and are not intended as limitations thereof.

Production Example 1 of Polyisoprene

Into a pressure glass bottle of 1 liter sufficiently dried in an inert gas atmosphere are charged 1.29 g of dimethylaluminum (μ-dimethyl)bis(pentamethylcyclopentadienyl)gadolinium [$(C_5Me_5)_2Gd(\mu\text{-Me})_2AlMe_2$] and 2.31 g of triphenylcarbonium tetrakis(pentafluorophenyl)borate [[$Ph_3C$][$B(C_6H_5)_4$]], which are dissolved in 250 mL of toluene. To the resulting solution is added 25 mL of a toluene solution of 1M tributylaluminum, which is left to stand at room temperature for 1 hour and cooled to −20° C. Into the solution is charged 340 g of a toluene solution of isoprene adjusted to 12.5 mass % to conduct the polymerization at −20° C. for 3 hours. Then, 2 mL of a 5% solution of an antioxidant BHT in methanol is added to stop the reaction, and further the reprecipitation is conducted in ethanol containing a slight amount of hydrochloric acid. The isolated polymer is air-dried in a draft chamber and then dried at 60° C. in a vacuum oven for 4 hours to obtain 38.7 g of a polyisoprene rubber A in a yield of 91%.

In the polyisoprene rubber A, the number average molecular weight (Mn) by a GPC is 982,600 and Mw/Mn is 2.01. As the micro-structure is determined from an integration ratio of 15.5-16.5 ppm (1,4-trans unit), 18.0-19.0 ppm (3,4-unit) and 23.0-24.0 ppm (1,4-cis unit), the cis-1,4-bond content is 99.6%, the trans-1,4-bond content is 0% and the 3,4-bond content is 0.4%.

Furthermore, the Mooney viscosity $ML_{1+4}$ (100° C.) of the resulting polyisoprene rubber is 81 as measured according to JIS K6300.

A rubber composition is prepared according to a compounding recipe shown in Table 1 by using the above polyisoprene rubber, and the processability, wear resistance and durability of the rubber composition are evaluated by the following methods.

(1) Processablity (Mill Shrinkage Test)

An uncured rubber is wound on a 3 inch roll having a roll temperature of 70° C. at an interval of 2 mm, and the roll is rotated. After the rotation is stopped, the roll is left to stand for 1 minute, and a rubber specimen is cut out at a line of 6 cm. After the rubber specimen is left to stand for 3 minutes, the shrinkage degree of the line of 6 cm is measured and the result is shown by an index on the basis that Comparative Example 6 is 100. The lager the index value, the better the shrink property and the better the processability.

(2) Wear Resistance

The worn amount is measured at room temperature by a Lamborn abrasion testing machine according to JIS K6264, and an inverse number of the worn amount is calculated and shown by an index on the basis that Comparative Example 6 is 100. The lager the index value, the smaller the worn amount and the better the wear resistance.

(3) Durability (Resistance to Crack Growth by Bending)

The test of crack growth by bending is carried out according to JIS K6260 to measure the bending number until the crack length becomes 12 cm, which is shown by an index on the basis that Comparative Example 6 is 100. The larger the index value, the larger the bending number and the better the resistance to crack growth by bending and the better the durability.

TABLE 1

| | | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Formulation | Natural rubber (RSS#3) | (parts by mass) | 90 | 75 | 50 | 90 | 75 | 50 | — | — | 100 |
| | Polyisoprene rubber A *1 | | 10 | 25 | 50 | — | — | — | 100 | — | — |
| | Polyisoprene rubber B *2 | | — | — | — | 10 | 25 | 50 | — | 100 | — |
| | Carbon black *3 | | 50 | 50 | 50 | 50 | 50 | 50 | 50 | 50 | 50 |
| | Stearic acid | | 2 | 2 | 2 | 2 | 2 | 2 | 2 | 2 | 2 |
| | Antioxidant 6C *4 | | 1 | 1 | 1 | 1 | 1 | 1 | 1 | 1 | 1 |
| | Zinc oxide | | 3 | 3 | 3 | 3 | 3 | 3 | 3 | 3 | 3 |
| | Vulcanization accelerator DZ *5 | | 0.8 | 0.8 | 0.8 | 0.8 | 0.8 | 0.8 | 0.8 | 0.8 | 0.8 |
| | Sulfur | | 1 | 1 | 1 | 1 | 1 | 1 | 1 | 1 | 1 |
| Evaluation | Processablity | (index) | 112 | 121 | 138 | 108 | 109 | 115 | 143 | 126 | 100 |
| | Wear resistance | | 101 | 99 | 99 | 99 | 97 | 93 | 97 | 85 | 100 |
| | Durability | | 97 | 94 | 90 | 87 | 84 | 79 | 86 | 70 | 100 |

*1 Produced by the above Production Example 1 of Polyisoprene.
*2 IR2200, made by JSR Corporation, cis-1,4-bond content = 98.0%, 3,4-bond content = 2.0%, $ML_{1+4}$ (100° C.) = 82.
*3 N339, made by Tokai Carbon Co., Ltd. $N_2SA$ = 93 m$^2$/g.
*4 N-(1,3-dimethylbutyl)-N'-phenyl-p-phenylenediamine, made by Ohuchi Shinkou Kagaku Co., Ltd., Nocrac 6C.
*5 N,N'-dicyclohexyl-2-benzothiazolyl sulfenamide, made by Ohuchi Shinkou Kagaku Co., Ltd. Noccler DZ.

As seen from Table 1, the processability in the rubber compositions of the examples is largely improved as compared with the rubber composition of Comparative Example 6, and the deterioration of the wear resistance and durability is suppressed and the balance between the processability and the dynamic properties is good. On the other hand, the processability in the rubber compositions of Comparative Examples 1-5 is improved as compared with the rubber composition of Comparative Example 6, but the deterioration of the wear resistance and durability is large.

INDUSTRIAL APPLICABILITY

According to the invention, there can be provided rubber compositions having an excellent balance between the processability and the dynamic properties such as wear resistance, durability and the like and characterized by comprising a polyisoporene rubber having a very high cis-1,4-bond content, a very low 3,4-bond content and a Mooney viscosity of a specified range. Also, there can be provided tires having excellent productivity, wear resistance and durability by using such a rubber composition.

The invention claimed is:

1. A tire characterized by using a rubber composition comprising as a rubber component, a rubber component consisting of (A) a synthetic polyisoprene rubber having a cis-1,4-bond content of not less than 99.0%, a 3,4-bond content of not more than 0.5% and a Mooney viscosity $ML_{1+4}$ (100° C.) of 20-110 and (B) a natural rubber, wherein a ratio by mass of (A) the synthetic polyisoprene rubber to a total of (A) the synthetic polyisoprene rubber and (B) the natural rubber is 10-60 mass % and a total content of (A) the synthetic polyisoprene rubber and (B) the natural rubber in the rubber component is not less than 80 mass %.

2. A tire according to claim 1, wherein the rubber composition comprises not less than 10 parts by mass of a reinforcing filler based on 100 parts by mass of the rubber component.

3. A tire according to claim 2, wherein the rubber composition comprises not less than 30 parts by mass of a reinforcing filler based on 100 parts by mass of the rubber component.

4. A tire according to claim 1, wherein the rubber composition is used for a tread of the tire.

5. A tire according to claim 1, wherein the rubber composition is used for a casing member of the tire.

6. A tire according to claim 1, characterized in that the rubber composition is applied to a tread or a casing member.

7. A tire according to claim 1, wherein the synthetic polyisoprene rubber has a cis-1,4-bond content of not less than 99.6% and a 3,4-bond content of not more than 0.4%.

8. A tire according to claim 1, wherein the synthetic polyisoprene rubber has a cis-1,4-bond content of not less than 99.9% and a 3,4-bond content of not more than 0.1%.

* * * * *